United States Patent [19]

Bouin

[11] Patent Number: 4,887,419
[45] Date of Patent: Dec. 19, 1989

[54] LIFTER APPARATUS OF VARIABLE GEOMETRY FOR CROPS WHICH ARE LEANING

[76] Inventor: Gérard Bouin, 9, rue de la Gravelle 86220, Dange-Saint-Romain, France

[21] Appl. No.: 227,779

[22] Filed: Aug. 3, 1988

[30] Foreign Application Priority Data

Aug. 4, 1987 [FR] France .................................. 87 11108

[51] Int. Cl.$^4$ ............................................. A01D 65/02
[52] U.S. Cl. .................................... 56/319; 56/DIG. 9
[58] Field of Search ................... 56/319, 314, DIG. 9, 56/DIG. 10, DIG. 17

[56] References Cited

U.S. PATENT DOCUMENTS

| 597,580 | 1/1898 | Jager ...................................... 56/314 |
| 694,441 | 3/1902 | Steward ................................. 56/319 |
| 2,542,617 | 2/1951 | Barney ............................ 56/314 UX |
| 2,701,434 | 2/1955 | Christopherson ................. 56/314 X |
| 2,892,298 | 6/1959 | Chaney ................................. 56/314 |

FOREIGN PATENT DOCUMENTS

| 1108503 | 6/1961 | Fed. Rep. of Germany . |
| 1125219 | 3/1962 | Fed. Rep. of Germany . |
| 1582208 | 7/1970 | Fed. Rep. of Germany . |
| 2427145 | 1/1976 | Fed. Rep. of Germany . |
| 2432829 | 3/1980 | France . |
| 279197 | 3/1952 | Switzerland . |
| 18926 | of 1910 | United Kingdom . |

OTHER PUBLICATIONS

French Search Report Mar. 1988.

Primary Examiner—Stephen J. Novosad
Attorney, Agent, or Firm—Cushman, Darby & Cushman

[57] ABSTRACT

The lifter apparatus of variable geometry, for harvesting crops which are leaning over which is adaptable to the cutter bars of harvesting machines and can assume a position of repose or a working position. The lifter includes a lifter element (1) capable of assuming various positions, two rocker bars (5, 6), connecting devices between the lifter element (1) and a support element (9), and a system for return (12) of the element (9). The lifter element (1) includes a slot (2), in which a swivel shaft (3) of one of the rocker bars (5) can slide. In the position of repose, the shaft (3) is located at one end of the slot (2), and in the working position, the shaft (3) is located toward the other end of the slot (2). The lifter is intended to remain permanently on the machine (position of repose) or to work (working position) under difficult conditions, and to slide under a very flattened or leaning crops and lift the same.

7 Claims, 5 Drawing Sheets

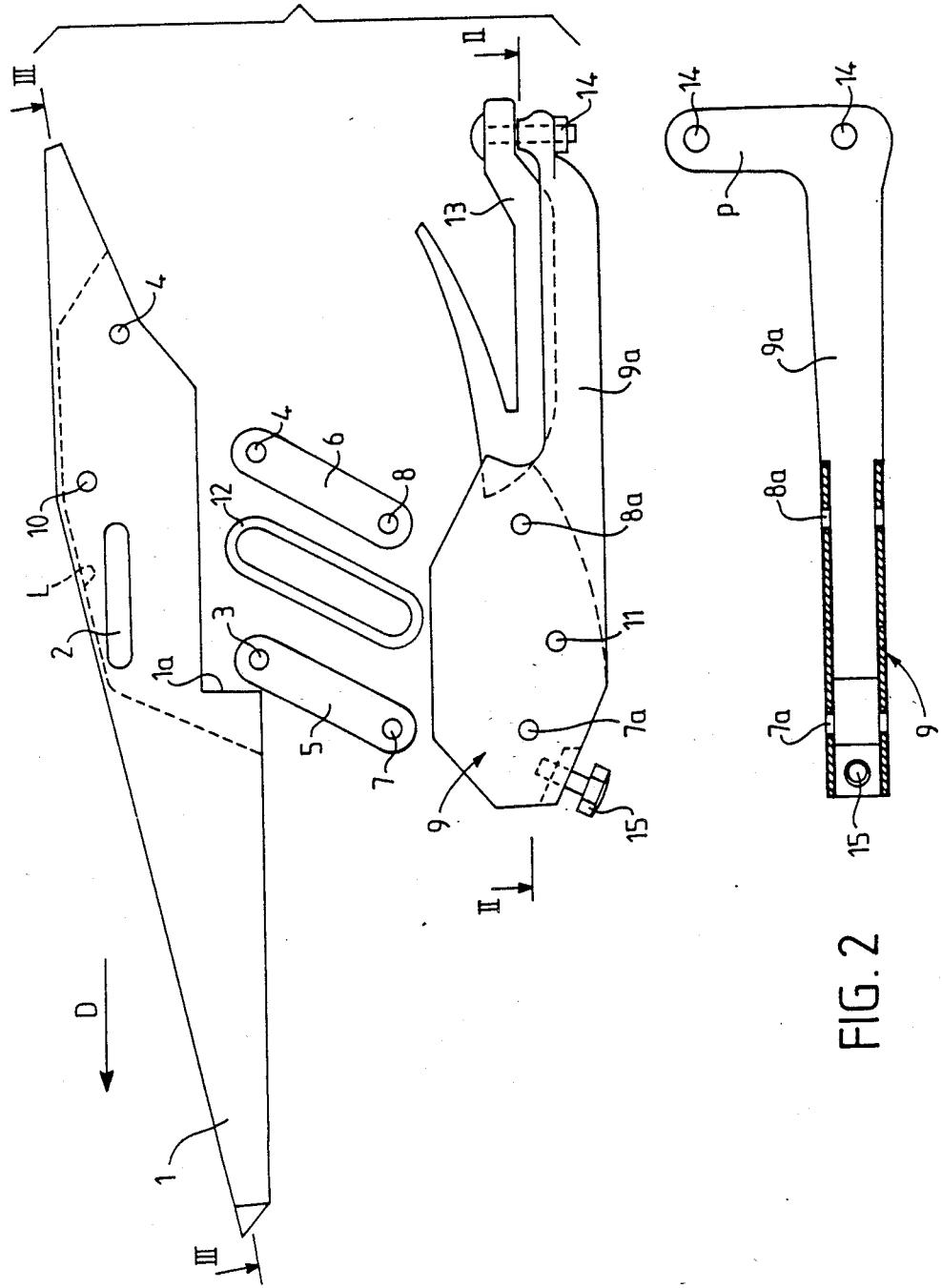

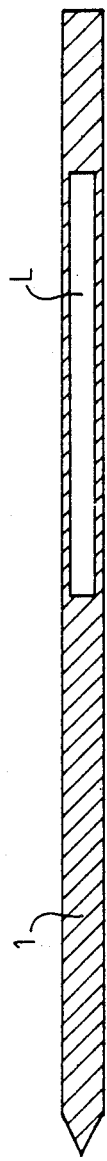
FIG. 3
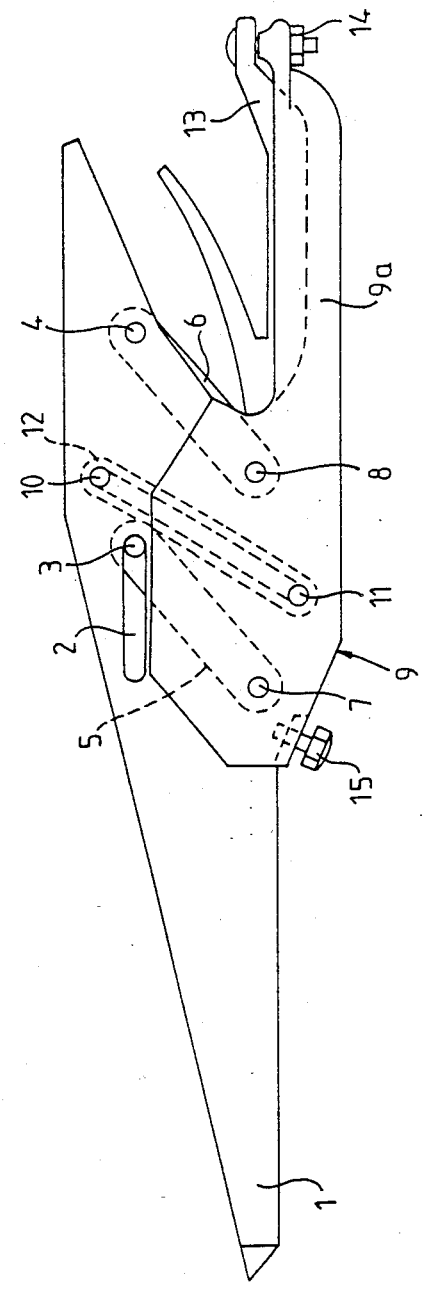
FIG. 4

LIFTER APPARATUS OF VARIABLE GEOMETRY FOR CROPS WHICH ARE LEANING

BACKGROUND OF THE INVENTION

The present invention relates to a lifter apparatus of variable geometry, for crops which are leaning over, intended to be adapted to any cutter bar of a harvesting machine.

Present conditions have lead farmers to seek diversification in their crops. Some crops do not present any problems, but others do, because they tend to lean over to a significant degree. This is true, for example, for leguminous plants, seed-bearing alfalfa, proteinaceous peas, and seed vetch; in graminaceous plants, it also applies to ryegrass, and fescue for seed production. All these plants must be systematically lifted as they are being harvested; this is a delicate operation, and the number of apparatuses thus far proposed to the user is certainly evidence that the present state of the art is not satisfactory.

This is the case with French Pat. No. 2 317 871, filed July 12, 1976. This very simple lifter affords no safety at all in terms of its function; it is not very well adapted to crops lying flat on the ground. Other lifters are more sophisticated, but they follow the irregularities of the ground poorly, and they are very vulnerable to breakage during their accidental encounters with the soil.

French Pat. No. 2 545 683, filed June 13, 1983, relates to a different kind of lifter, but a study of this patent, and reducing it to practice, confirms its fragility; it does not have a safety system, and its runner has to slide on dry, hard soil in order to make the part called a piston work; it does not permit locking the cutter bar at ground level, because the cylindrical tube is structurally fixed to the horizontal and vertical supports, and the part called the piston cannot function unless the harvesting machine is driven forward.

Moreover, although to prevent wear and breakage, it is not recommended that the lifters mentioned above be left permanently on the machine, it is imperative that the lifter of French Pat. No. 2 545 683 be removed again after use.

SUMMARY OF THE INVENTION

The lifter apparatus of the present patent application is intended to provide a solution to all the problems discussed above.

By being permanently mounted to the harvesting machine, it provides for less labor of a kind that is difficult and dangerous. Indeed, mounting and removing the lifter is dangerous work for the operator, because it is done on a cutter bar that has cutting elements and sharply-pointed prongs. This novel lifter includes both a position of repose, enabling it to be permanently mounted on the cutter bar, and a working position which is very easily controlled for the various brands of harvesting machine.

According to the invention, the lifter apparatus for drooping or leaning crops, intended for adaptation to any cutter bar of a harvesting machine and including a support element intended to be fixed to a guide of the cutter bar and a lifter element connected to the support, is characterized in that the connection between the support element and the lifter element is attained with the aid of two rocker bars, swiveling on the support element and on the lifter element, respectively. The lifter element includes a slot in which a swivel shaft of one of the rocker bars can slide. The entire apparatus is arranged to assume a position of repose, in which the swivel shaft is located at one end of the slot and the lifter element is spaced apart from the ground, and a working position, in which the tip of the lifter bar can rest on the ground, with the swivel shaft being located toward the other end of the slot.

Preferably, the slot provided in the lifter element is rectilinear and is oriented substantially parallel to the forward direction of the machine.

The swivel shaft that is slidable in the slot is the upper hinge pin of the rocker bar located forward of the other rocker bar.

Advantageously, in the position of repose, the rocker bars are substantially parallel and are inclined in such a way that their upper ends are located to the rear of the lower ends, while in the working position, the rocker bars have concurrent directions toward the ground. The forward rocker bar is inclined to a greater extent than the rear rocker bar, and the swivel shaft sliding in the slot is located to the front of this slot.

The lifter apparatus preferably includes a return system between the support element and the lifter element.

The return system advantageously includes elastic means, in particular an elastic band or a spring, stretched between two shafts that are integral with the lifter element and the support element, respectively.

The present invention may include a cavity engaged on the inside by the support element, which is thus covered by said lifter element.

The invention will now be explained in detail in terms of an exemplary embodiment, which however is not to be considered limiting, in conjunction with the accompanying drawings.

BRIEF DESCRIPTION OF THE DRAWING

FIG. 1 is an exploded view of the apparatus according to the invention;

FIG. 2 is a longitudinal section taken along the line II—II of FIG. 1 through the support element;

FIG. 3 is a longitudinal section taken along the line III—III of FIG. 1 through the lifter element;

FIG. 4 is a view of the lifter element in the raised position, moved the back, which is the position of repose;

DESCRIPTION OF THE PREFERRED EMBODIMENT

Figure 5:
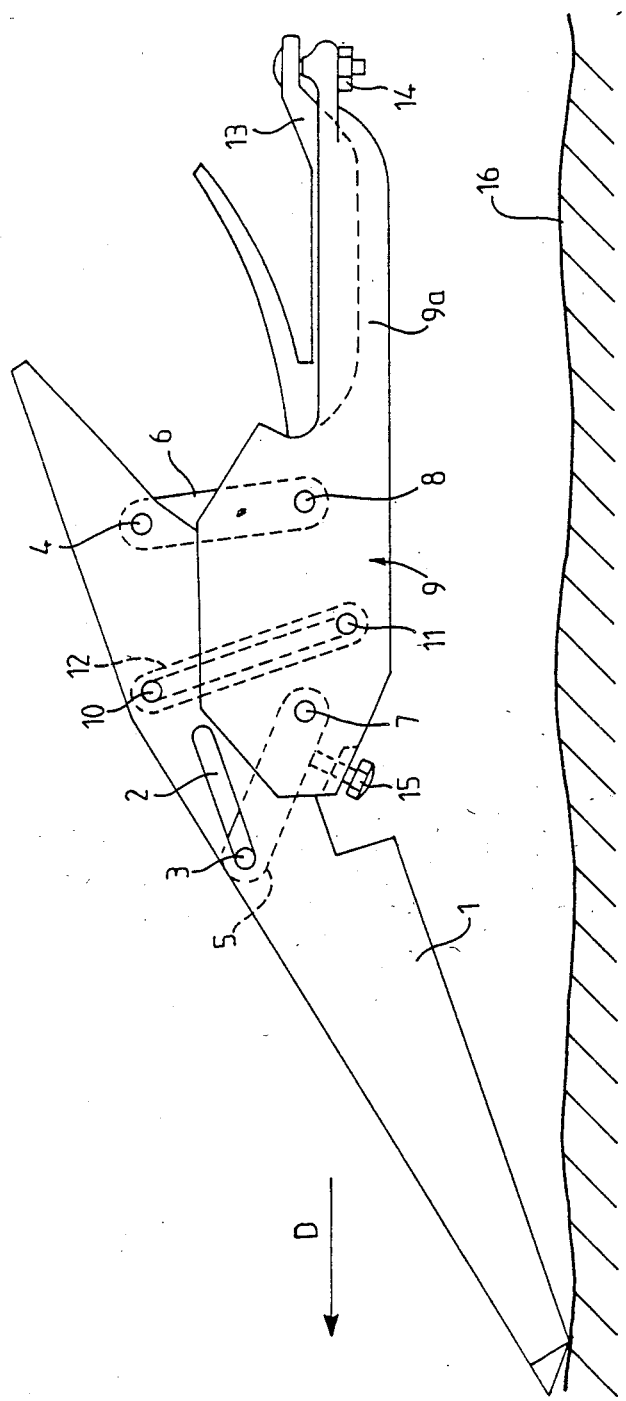
FIG. 5 is a view of the lifter at the front tip of the lifter element which has been lowered and moved forward into the working position.

As shown in the drawings, the crop lifter apparatus includes a lifter element 1 the particular shape of which is clearly visible in FIG. 1. This shape, for the front portion, is substantially that of a triangle, with an acute angle located at the tip of the element; the side of this triangle turned toward the ground includes a shoulder 1a in its rear portion. A runner (not shown) could be provided at the front end of the element 1, intended for resting on the ground. The lifter element 1 includes a slot 2, which is rectilinear and substantially parallel to the forward direction of a machine equipped with the lifter device. A swivel shaft 3 of the upper end of a rocker bar 5 is mounted to slide in the slot 2. This rocker bar 5 is located in front, in terms of the direction D, with respect to a second rocker bar 6. Rocker bar 6 is mounted for swiveling at its upper end on a shaft 4 supported by the support element 1.

The two swiveling rocker bars 5 and 6 serve as connecting devices between the lifter element 1 and a support element 9. This element 9 includes a front portion of lesser height, the contour of which is visible in the drawings, extended to the rear with an extension 9a. The front portion of the element 9 includes a seat, open at the top and defined by two walls 9b, 9c, between which the lower portions of the rocker bars 5, 6 are engaged. Holes 7a and 8a are provided on this element 9 for receiving swivel shafts 7, 8 provided at the lower ends of the rocker bars 5 and 6, respectively.

The lifting element 1 includes a cavity L and has a shaft 10 in the zone of this cavity included between the slot 2 and the shaft 4, which the support element 9 has a shaft 11 located between the shafts 7 and 8. A return system is provided between the elements 1 and 9, and this return system may include a powerful elastic band 12, or a spring of suitable shape, stretched between the shafts 10 and 11.

In an advantageous variant, not shown, the element 1 includes a cavity of sufficiently large dimension, in which the support element 9 is disposed and is thus covered by the lifter element 1.

The element 9 has the shafts 7 and 8 and the lower fixation shaft 11 of the return system 12. An adjusting screw 15 serving to limit the course of the rocker bar 5 is provided towards the front lower end of the element 9.

Means for fixation of the lifter device on the machine are provided and include a cross arm p (FIG. 1) integral with the extension 9a. Holes are provided in this arm p to permit the passage of fixation bolts 14 on either side of a prong 13 belonging to the cutting device of the machine.

The functioning of the lifter apparatus is as follows.

In the position of repose (FIG. 4), the element 1 is locked in the upper, returned position and is higher than the prongs 13, and the cutter bar of the machine traverses these prongs. The element 1 is thus protected from being worn down on the ground 16, and from useless labor resulting from unevenness of the terrain. In the position of repose, the lifter does not in any way impede the cutting work of the machine, and does not obstruct the normal passage of the crop.

The position of repose of the lifter is obtained by hand with complete safety, without effort on the part of the operator, and in a few moments for the lifters of one machine, beginning at the working position: The front portion of the element 1 is grasped, which raises it and pushes it toward the back, causing the apparatus to be locked automatically because the upper portion of the rocker bars 5 and 6 rock toward the rear, by rotation about their shafts 7 and 8. The shaft 3 of the rocker bar 5 comes to slide toward the back in the slot 2 provided in the element 1. The hollow position L enables the movement of the rocker bars 5 and 6 and the passage of the return system 12.

The element 1 then assumes the position of repose, resting on the element 9. The position of repose is kept solidly in place by the return system 12. The working position (FIG. 5), which enables the element 1 to slide under the leaning crop, is obtained, beginning at the position of repose, by pulling on the front of the element 1 and lowering it by hand.

A few moments are sufficient for all the lifters of one machine to be placed in their desired position in complete safety for the operator.

Under the influence of traction toward the front, the element 1 is lifted by the action of the rocker bars 5 and 6, which by rotation about the shafts 7 and 8 pass from the position inclined toward the rear to a position inclined toward the front.

The element 1 moves forward but remains in a raised position. Energetic vertical pressure on the front point of the element 1 causes the shaft 3 of the rocker bar 5 to slide from the rear end toward the front end of the slot 2.

The rocker bar 5 then assumes a position that is highly inclined toward the front, while the upper portion of the rocker bar 6 moves slightly back, which brings about the position highly inclined toward the front of the element 1. This inclination is adjustable by the action of the screw 15 over the course of the rocker bar 5.

Figure 6:
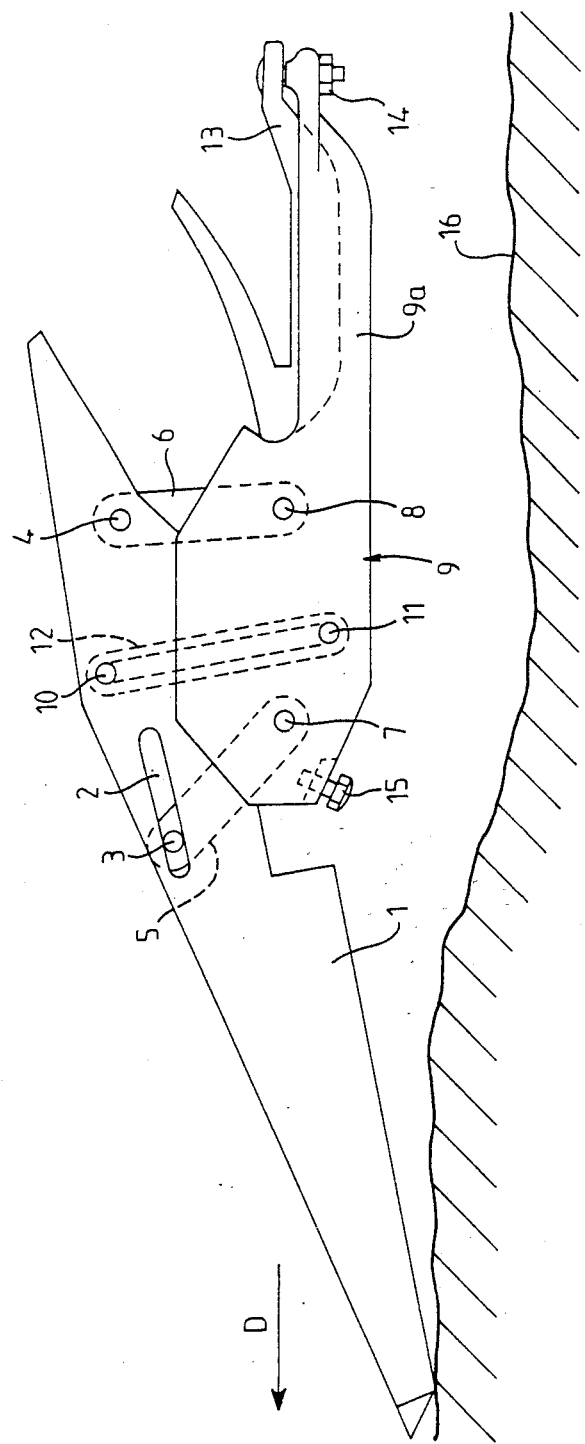
FIG. 6 is a view of the lifter in the working position, at the time the cutter bar is locked in place, or for work on rough ground.

In the working position (FIG. 6), when the driver of the machine places the cutter bar on the ground 16, the front of the element 1, comes into contact with the ground. At this moment, the shaft of the rocker bar 5 slides in the slot 2 toward the rear, the shaft 4 of the rocker bar 6 moves slightly back, and the position is automatically adjusted to the ground 16. In the working position (FIG. 6), that is, the same position as above, when the machine is driven forward with the cutter bar slightly raised, the front point of the element 1 is in contact with the ground 16 because of its weight and by the action of the return system 12; because its front point is raised slightly, the element 1 is raised over rough ground 16, and the effect on the apparatus is the same as when the cutter bar is locked in place at the level of the ground 16. The shaft 3 of the rocker bar 5 slides in the slot 2 toward the rear, the shaft 4 of the rocker bar 6 moves slightly back, with the effect of allowing the front point of the element 1 to be raised vertically and to adjust to the ground 16.

Figure 7:
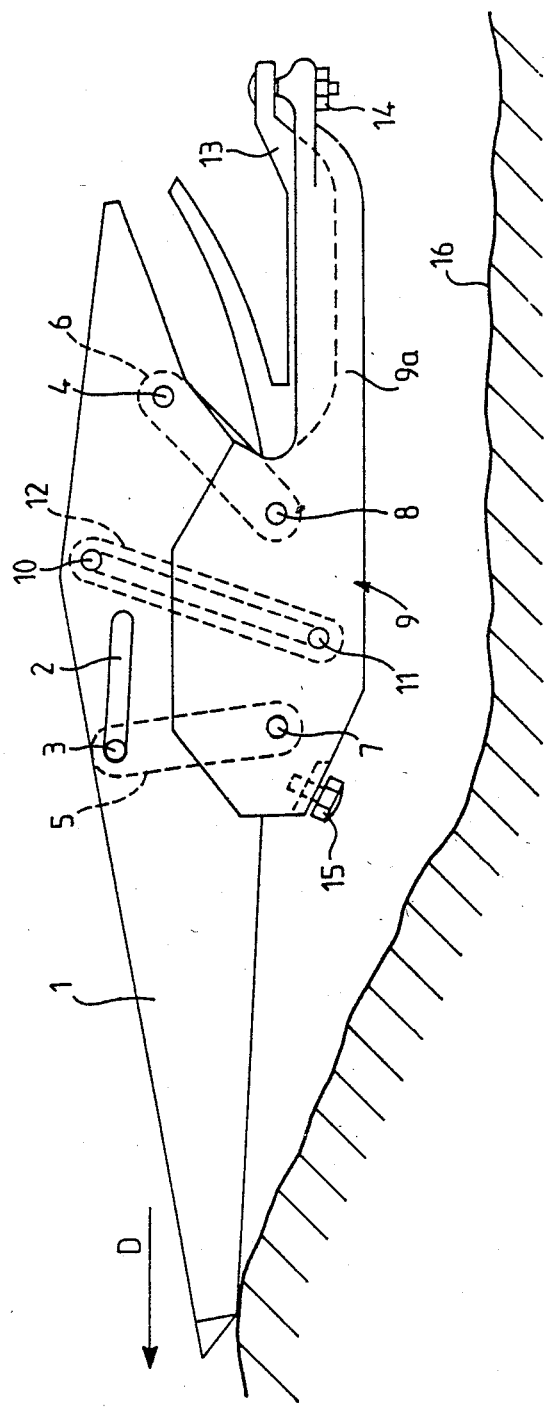
FIG. 7 is a view of the lifter in the working position, but safeguarded above an excessive elevation of the ground forming an obstacle.

The working position, with safeguarding, is shown in FIG. 7. If the front point of the element 1 inadvertently comes into contact with the ground 16 by an incorrect maneuver or because of an excessive elevation of the ground 16 that is hidden from the driver by the vegetation covering it, the force exerted longitudinally on the element 1 by the forward movement of the machine causes the front of the slot 2 to come to a stop on the shaft 3 of the rocker bar 5, which is now highly inclined toward the front. The element 1 moves back under the resistance of the obstacle, because of the forward movement of the machine. At this moment, the shaft 3 of the rocker bar 5 moves back, rising with it to in front of the element 1. The shaft 4 of the rocker bar 5 also moves back and moves lower, driving with it the rear portion of the element 1, which accentuates the rocking effect of the element 1. The return system 12 stretches.

The more resistance the obstacle presents, the greater the reaction of the lifter.

The element 1 moves back, the angle of entry into the obstacle turns into an angle of exit, which can put the front point of the element 1 at a height equal to or greater than the cutting level of the machine. This is a theoretical margin of safety which surpasses what is actually needed, since it is virtually equivalent to the position of repose of the lifter. In practice, the adjustment is likely done before this limit is reached, and the return system 12, once the obstacle is passed, resumes the initial working position on the element 1.

The present crop lifter device will be of interest to all farmers who grow, or wish to grow, plants likely to droop or lean or be disposed flat on the ground from wind and storms. The lifter will also be of interest to designers of agricultural machines, who will be able to propose a novel, efficient and reliable apparatus to their clients

What is claimed is:

1. A harvesting lifter device intended for adaptation to any cutter bar of a harvesting machine of the type having a support element intended to be fixed to a guide of the cutter bar and a lifter element, means connecting said lifter element to said support element for relative movement, said connecting means comprising first and second rocker bars each having opposite ends with means rotatably engaging respectively said lifter element and said support element, said lifter element having a slot and said means rotatably engaging said first rocker bar including a swivel shaft disposed in said slot and slidable therein between a first position corresponding to a state of repose of said lifter element wherein said lifter element is above the ground to a second position corresponding to a working state wherein said lifter element will have a portion thereof engaging the ground.

2. An apparatus as defined by claim 1, characterized in that the slot (2), provided in the lifter element (1), is rectilinear and is oriented substantially parallel to the forward direction (D) of the machine.

3. An apparatus as defined by claim 1, characterized in that the swivel shaft (3) which can slide in the slot is the upper hinge pin of the rocker bar (5) located forward of the other rocker bar (6).

4. An apparatus as defined by claim 1, characterized in that in the position of repose, the rocker bars (5, 6) are substantially parallel and are inclined in such a way that their upper ends are located to the rear of the lower ends, while in the working position, the rocker bars (5, 6) have concurrent directions toward the ground (16), the swivel shaft (3) sliding in the slot (2) being located to the front of this slot.

5. An apparatus as defined by claim 1, characterized in that it includes a return system (12) between the support element and the lifter element.

6. An apparatus as defined by claim 5, characterized in that the return system (12) includes elastic means, in particular an elastic band or a spring, stretched between two shafts (10, 11) integral with the lifter element (1) and the support element (9), respectively.

7. An apparatus as defined by claim 1, characterized in that it includes an adjusting screw (15) making it possible to limit the course of one rocker bar (5) in order to regulate the working position.

* * * * *